(12) United States Patent
Khristi et al.

(10) Patent No.: US 11,063,750 B2
(45) Date of Patent: *Jul. 13, 2021

(54) SYSTEMS AND METHODS FOR SECURED WEB APPLICATION DATA TRAFFIC

(71) Applicant: Citrix Systems, Inc., Fort Lauderdale, FL (US)

(72) Inventors: Keyoor Khristi, Bengaluru (IN); Mukul Agarwal, Bengaluru (IN); Ravi Ganesh, V, Bengaluru (IN); Saurabh Singh, Bengaluru (IN); Vishnu Prateek, Bengaluru (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/774,676

(22) Filed: Jan. 28, 2020

(65) Prior Publication Data
US 2020/0169394 A1    May 28, 2020

Related U.S. Application Data

(63) Continuation of application No. 15/876,828, filed on Jan. 22, 2018, now Pat. No. 10,574,444.

(51) Int. Cl.
*H04L 9/08* (2006.01)
*H04L 29/06* (2006.01)
(Continued)

(52) U.S. Cl.
CPC ............ *H04L 9/0827* (2013.01); *H04L 9/006* (2013.01); *H04L 9/0825* (2013.01);
(Continued)

(58) Field of Classification Search
CPC . H04L 9/0827; H04L 9/0894; H04L 63/0823; H04L 9/3236; H04L 9/0825;
(Continued)

(56) References Cited

U.S. PATENT DOCUMENTS 7,478,422 B2 * 1/2009 Valente ............... H04L 41/0609
726/4
7,640,427 B2   12/2009 Callas et al.
(Continued)

FOREIGN PATENT DOCUMENTS

EP    1 357 458 A2    10/2003

OTHER PUBLICATIONS

Notice of Allowance for U.S. Appl. No. 15/876,828, dated Oct. 17, 2019.

*Primary Examiner* — Badri Narayanan
*Assistant Examiner* — Badri Champakesan
(74) *Attorney, Agent, or Firm* — Foley & Lardner LLP

(57) ABSTRACT

Systems and methods for secured access to cloud-based applications or services include a service node that may receive a request from client including a URL associated with an application manager. The service node may send a URL prefix identifying a termination to the termination node. The service node may receive a client hello message from the client that includes a first field incorporating the URL prefix, and may send the client hello message to the termination node to initiate a handshake with the client using a wildcard certificate of server, for establishing a SSL channel between the client and the termination node for a session of the application. The service node can direct a communication of the session from the client to the predetermined termination node, for decryption, using the established SSL channel, according to the URL prefix incorporated in a server name indication (SNI) field of the communication.

17 Claims, 9 Drawing Sheets

(51) Int. Cl.
*H04L 9/32* (2006.01)
*H04L 9/00* (2006.01)

(52) U.S. Cl.
CPC .......... *H04L 9/0894* (2013.01); *H04L 9/3228* (2013.01); *H04L 9/3236* (2013.01); *H04L 63/0823* (2013.01)

(58) Field of Classification Search
CPC ... H04L 9/3228; H04L 9/006; H04L 63/0428; H04L 67/02; H04L 63/0281; H04L 63/166
USPC ............................................................ 726/4
See application file for complete search history.

(56) References Cited

U.S. PATENT DOCUMENTS

| | | | |
|---|---|---|---|
| 8,549,157 B2* | 10/2013 | Schnellbaecher | H04L 63/0281 709/229 |
| 8,627,424 B1* | 1/2014 | O'Malley | H04L 63/0838 726/6 |
| 8,776,249 B1 | 7/2014 | Margolin | |
| 9,083,531 B2* | 7/2015 | Chenna | H04L 9/3263 |
| 10,298,560 B2* | 5/2019 | Glasgow | H04L 63/108 |
| 2008/0060055 A1* | 3/2008 | Lau | H04L 9/3263 726/3 |
| 2008/0244744 A1* | 10/2008 | Thomas | H04L 63/0281 726/23 |
| 2008/0320566 A1* | 12/2008 | Herzog | H04L 9/3263 726/4 |
| 2011/0289311 A1* | 11/2011 | Roy-Chowdhury | H04B 7/18593 713/151 |
| 2012/0023554 A1* | 1/2012 | Murgia | H04L 63/083 726/4 |
| 2013/0227291 A1* | 8/2013 | Ahmed | H04L 63/0884 713/171 |
| 2014/0181314 A1* | 6/2014 | Barzilai | H04L 67/2823 709/227 |
| 2016/0323107 A1* | 11/2016 | Bhogal | H04L 9/3247 |
| 2017/0019410 A1* | 1/2017 | Reilly | G06F 21/31 |
| 2018/0062995 A1* | 3/2018 | Naar | H04L 63/0428 |
| 2018/0205742 A1* | 7/2018 | Vinukonda | H04L 63/107 |
| 2019/0036908 A1* | 1/2019 | Liu | H04L 63/0823 |
| 2019/0074982 A1* | 3/2019 | Hughes | H04L 9/0863 |
| 2019/0182250 A1* | 6/2019 | Kiester | H04L 63/0428 |
| 2019/0222588 A1* | 7/2019 | Marzorati | H04L 63/1466 |

* cited by examiner

SYSTEMS AND METHODS FOR SECURED WEB APPLICATION DATA TRAFFIC

CROSS-REFERENCE TO RELATED APPLICATION

This patent application is a continuation of, and claims priority to and the benefit of U.S. patent application Ser. No. 15/876,828, titled "SYSTEMS AND METHODS FOR SECURED WEB APPLICATION DATA TRAFFIC," and filed Jan. 22, 2018, the contents of all of which are hereby incorporated herein by reference in its entirety for all purposes.

FIELD OF THE DISCLOSURE

This disclosure generally relates to systems and methods for providing secured access to web (or online) applications or services including but not limited to systems and methods for providing access to online or web application while making sensitive data traffic of such applications inaccessible to cloud service providers.

BACKGROUND

Client devices can remotely access cloud-based applications and/or services via access points or gateways (e.g., application delivery controllers (ADCs)) provided by the cloud provider. To protect and secure cloud-hosted data or services, cloud providers can employ one or more data security protocols or solutions, such as the Software-Defined Perimeter (SDP) protocol. The SDP protocol allows for providing an easy and more integrated secure access to online or web applications and/or services. In a SDP compliant system, access points or gateways can act as proxies and establish secured connections or links with client devices accessing cloud-based applications or services and internal entities (within the cloud) associated with resources of the cloud-based applications or services. As such, data associated with the cloud-based applications or services is communicated over secured links within the cloud or externally with client devices.

SUMMARY OF THE INVENTION

This Summary is provided to introduce a selection of concepts in a simplified form that are further described below in the Detailed Description. This Summary is not intended to identify key features or essential features, nor is it intended to limit the scope of the claims included herewith.

The present disclosure is directed toward systems and methods of black traffic based delivery of cloud applications and/or services. Specifically, systems and methods of the current disclosure allow for making or keeping data traffic of cloud applications and/or services opaque or inaccessible to the cloud service or corresponding entities. To prevent access to data traffic of cloud applications and/or services by the cloud service or by corresponding entities, secured connections or sessions between client devices and the cloud can be terminated at entities or components managed by the application or service provider rather than at entities or components managed by the cloud provider. Accordingly, the cloud service or corresponding entities can have access to encrypted data traffic exchanged between the client devices and cloud applications or services, but cannot have access to the corresponding decrypted data traffic.

Existing cloud services, such as Citrix Cloud service, pose a security challenge to cloud-based (or online) application or service providers. In particular, when a client device requests access to a cloud-based application or service, a node of the cloud service hosting the cloud-based application or service establishes a secure sockets layer (SSL) session (or a secured connection, in general) with the client device and another SSL session (or secured connection) with an entity (e.g., cloud connector or server) serving data associated with the cloud-based application or service. The node of the cloud service decrypts encrypted data traffic received over one of the SSL sessions, and encrypts the data traffic for sending on the other SSL session. The decryption of the data traffic by the node of the cloud service provides the cloud service or corresponding entities access to sensitive data (e.g., user data or application/service related data) exchanged between the client device and the cloud-based application or service. The access to the sensitive data poses a security threat to data and/or infrastructure of the cloud-based application or service.

Systems and methods described herein restrict access to data traffic of cloud-based applications or services by entities managed by the cloud service provider. Secured connections established with client devices for exchanging application or service data traffic can be configured to be terminated at entities managed by the cloud-based application or service. For instance, cloud connectors associated with a cloud-based application or service can be configured to maintain private keys of the secured connections established with the client devices. Entities managed by the cloud service provider cannot have access to the private keys, and can access only encrypted versions of data traffic exchanged over the secured connections.

The systems and methods described herein enhance the security of data and/or infrastructure of cloud-based (or online) applications or services. By preventing access by the cloud service (or entities managed by the cloud service provider) to decrypted data traffic of cloud-based (or online) applications or services, systems and methods described herein help protect against external threats to application/service infrastructure, and reduce the likelihood of unauthorized access to sensitive data.

In one aspect, the present disclosure is directed to embodiments of a system for access to an application of a server. The system can include a device intermediary between a client and a server, an application manager executable on the device, and a service node of the device. The application manager can be configured to provide the client access to the application of the server. The service node can be configured to receive a first request from the client via the application manager. The first request can specify a fully qualified domain name of the server to initiate access to the application. The service node can send a uniform resource locator (URL) prefix to a predetermined termination node (also referred to as a connector or cloud connector) for secure connection to the server. The URL prefix can include a key for identifying the predetermined termination node. The service node can receive a client hello message from the client that includes a first field incorporating the URL prefix. The predetermined termination node can have a wildcard certificate of the server matching a hostname of the first field. The service node can send, responsive to identifying the predetermined termination node using the URL prefix incorporated in the first field, the client hello message to the termination node to initiate a handshake with the client using the wildcard certificate, for establishing a secure session layer (SSL) channel between the client and the termination node for a session of the application. The service node can direct, to the predetermined termination node for decryption, a communication of the session from the client to the predetermined termination node using the established SSL channel, according to the URL prefix incorporated in a server name indication (SNI) field of the communication.

In some embodiments, the application manager can be further configured to perform authentication for the received first request, and provide access to the application of the server responsive to the authentication. The application manager can be further configured to send, responsive to the client initiating access to the published application, a second request to the service node.

In some embodiments, the service node can be further configured to generate a one-time-password (OTP) and the URL prefix. The URL prefix can include a key for a hash table of the service node corresponding to a value specifying the predetermined termination node. The service node can send the OTP and URL prefix to the predetermined termination node. The service node can be further configured to send the OTP and the URL prefix to the client. The service node can be further configured to identify, according to the hash table of the service node and the URL prefix incorporated in the first field of the client hello message, the predetermined termination node. The first field can include a SNI field. The service node can be further configured to send the client hello message to the termination node via a proxy connection between the service node and the predetermined termination node. The client hello message can further cause the predetermined termination node to validate using the OTP the client's request for establishing the session of the application within the established SSL channel. The service node can be further configured to forward, via the proxy connection to the client for decryption, a response from the predetermined termination node to the communication.

In some embodiments, the predetermined termination node can have private keys of the server. The service node can be further configured to bypass decryption of the communication at the service node. The communication can be decrypted at the predetermined termination node using the private keys.

In another aspect, the disclosure is directed to a method for accessing an application of a server. The method can include providing, by an application manager of a device intermediary between a client and a server, access to an application of the server. The method can include receiving, by a service node of the device via the application manager, a first request from the client specifying a fully qualified domain name of the server. The method can include sending, by the service node, a uniform resource locator (URL) prefix to a predetermined termination node (also referred to as a connector or a cloud connector) for secure connection to the server. The URL prefix can include a key for identifying the predetermined termination node. The method can include receiving, by the service node, a client hello message from the client that includes a first field incorporating the URL prefix. The predetermined termination node can have a wildcard certificate of the server matching a hostname of the first field. The method can include sending, by the service node responsive to identifying the predetermined termination node using to the URL prefix incorporated in the first field, the client hello message to the termination node to initiate a handshake with the client using the wildcard certificate, for establishing a secure session layer (SSL) channel between the client and the termination node for a session of the application. The method can include directing, by the service node to the predetermined termination node for decryption, a communication of the session from the client to the predetermined termination node using the established SSL channel, according to the URL prefix incorporated in a server name indication (SNI) field of the communication.

In some embodiments, the method can further include the application manager performing, responsive to the first request, authentication for the received first request, and providing, responsive to the authentication, access to the application of the server. The method can further include the application manager sending, responsive to the client initiating access to the published application, a second request to the service node.

In some embodiments, the method can further include the service node generating a one-time-password (OTP) and the URL prefix. The URL prefix can include a key for a hash table of the service node corresponding to a value specifying the predetermined termination node. The service node can send the OTP and URL prefix to the predetermined termination node. The method can further include sending, by the service node, the OTP and the URL prefix to the client. The method can further include the service node identifying, according to the hash table of the service node and the URL prefix incorporated in the first field of the client hello message, the predetermined termination node. The first field can include a SNI field. The method can further include sending the client hello message to the termination node via a proxy connection between the service node and the predetermined termination node. The client hello message can further cause the predetermined termination node to validate using the OTP the client's request for establishing the session of the application within the established SSL channel. The method can further include the service node forwarding, via the proxy connection to the client for decryption, a response from the predetermined termination node to the communication.

In some embodiments, the predetermined termination node can have private keys of the server. The method can further include bypassing, by the service node, decryption of the communication at the service node. The communication can be decrypted at the predetermined termination node using the private keys.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for providing access to cloud-based applications or services.

A. Network and Computing Environment

Figure 1A:
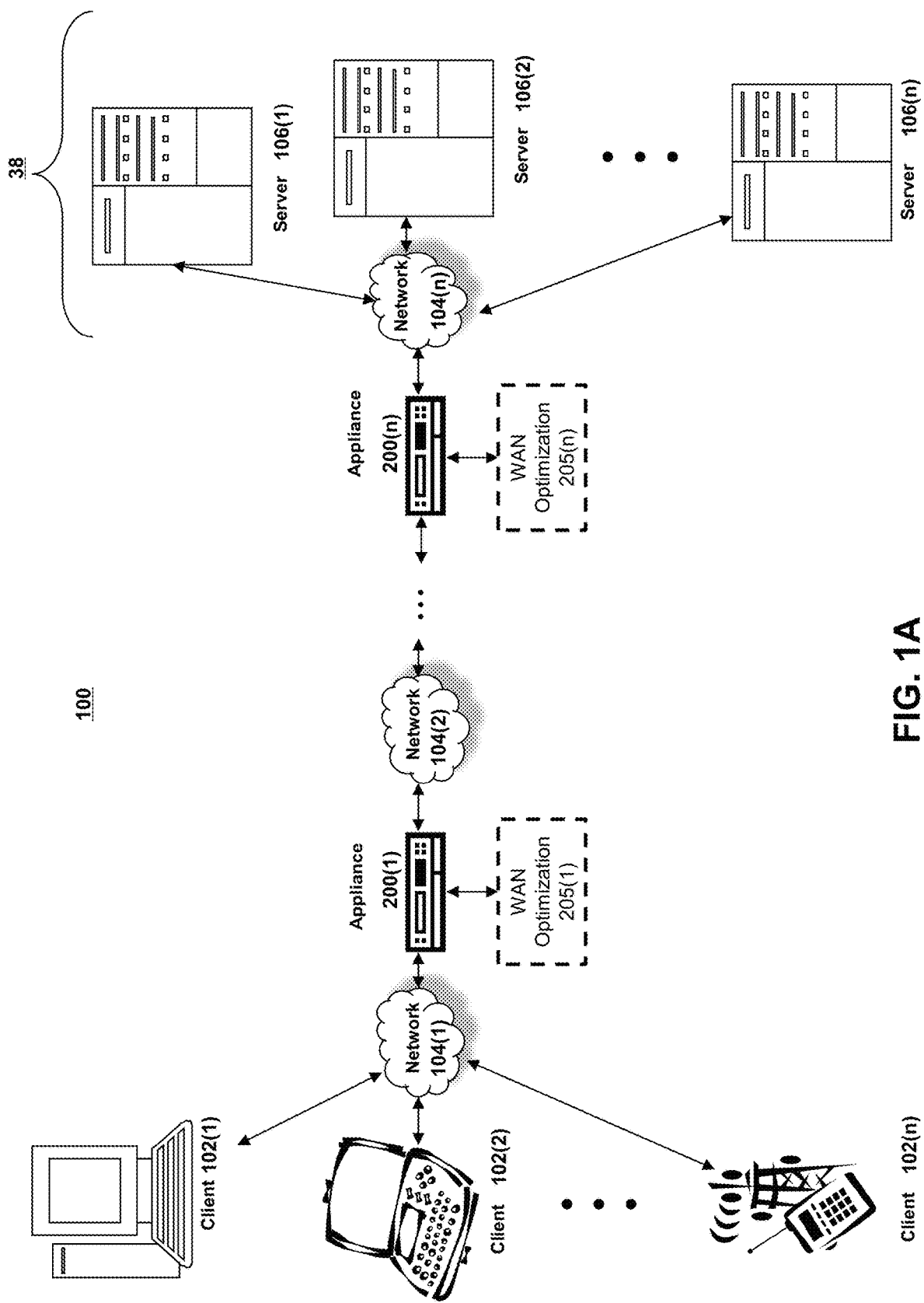
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
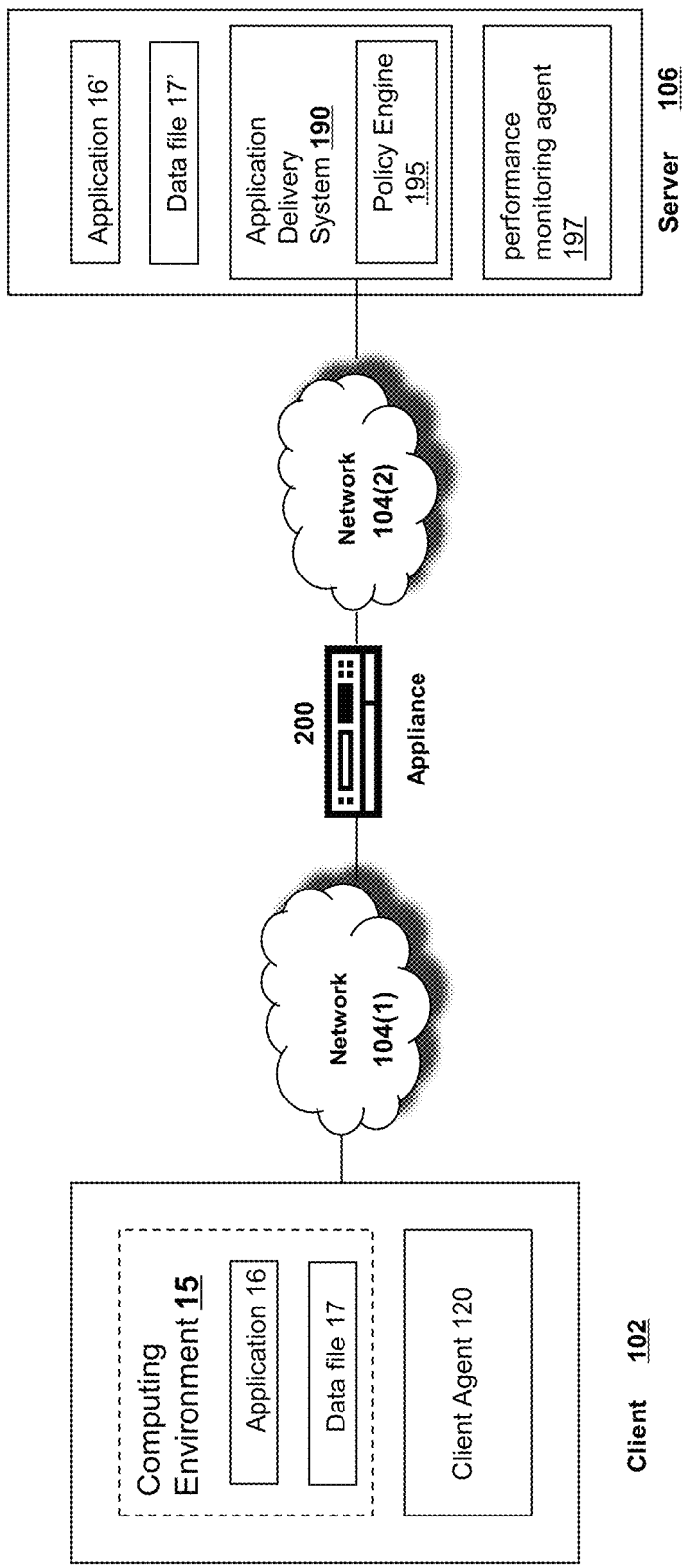
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
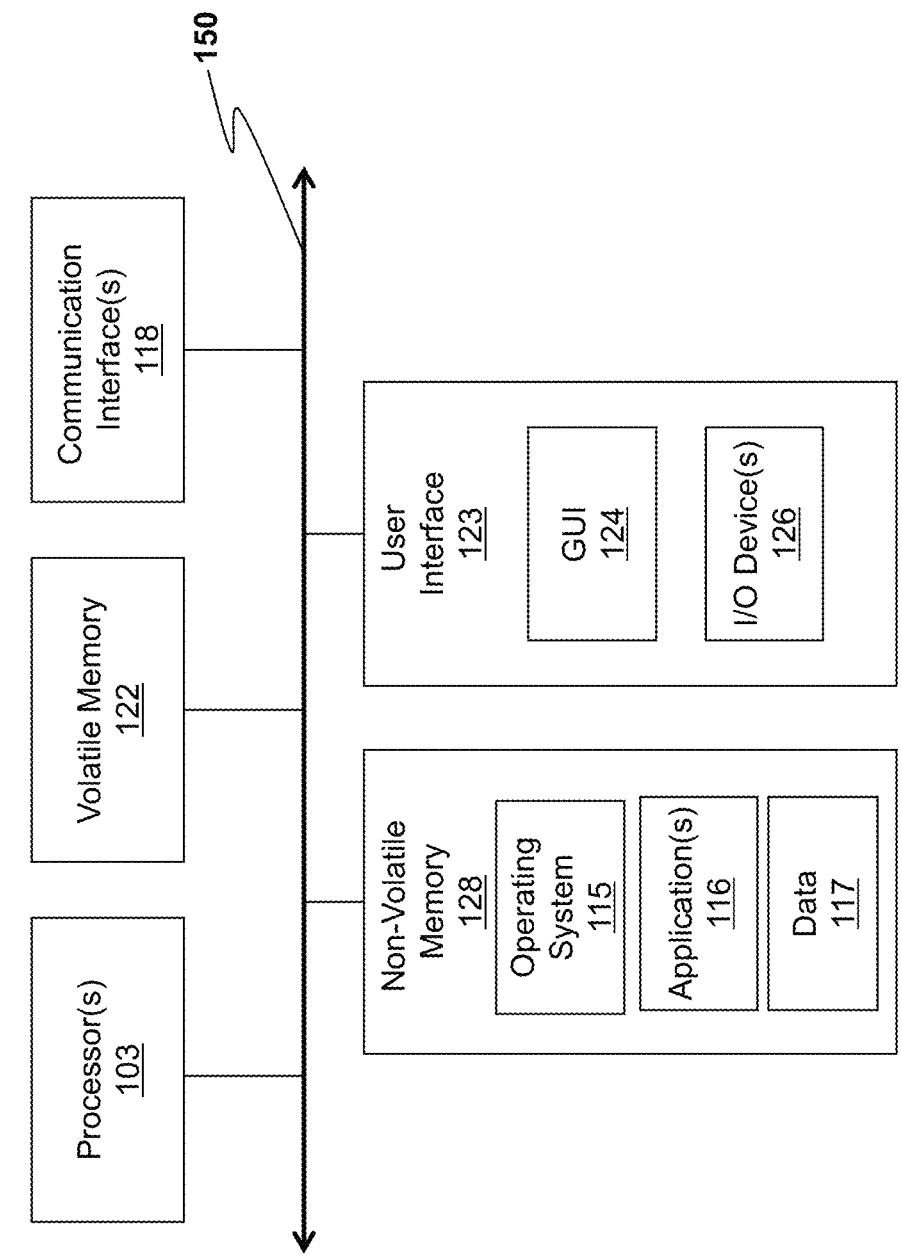
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
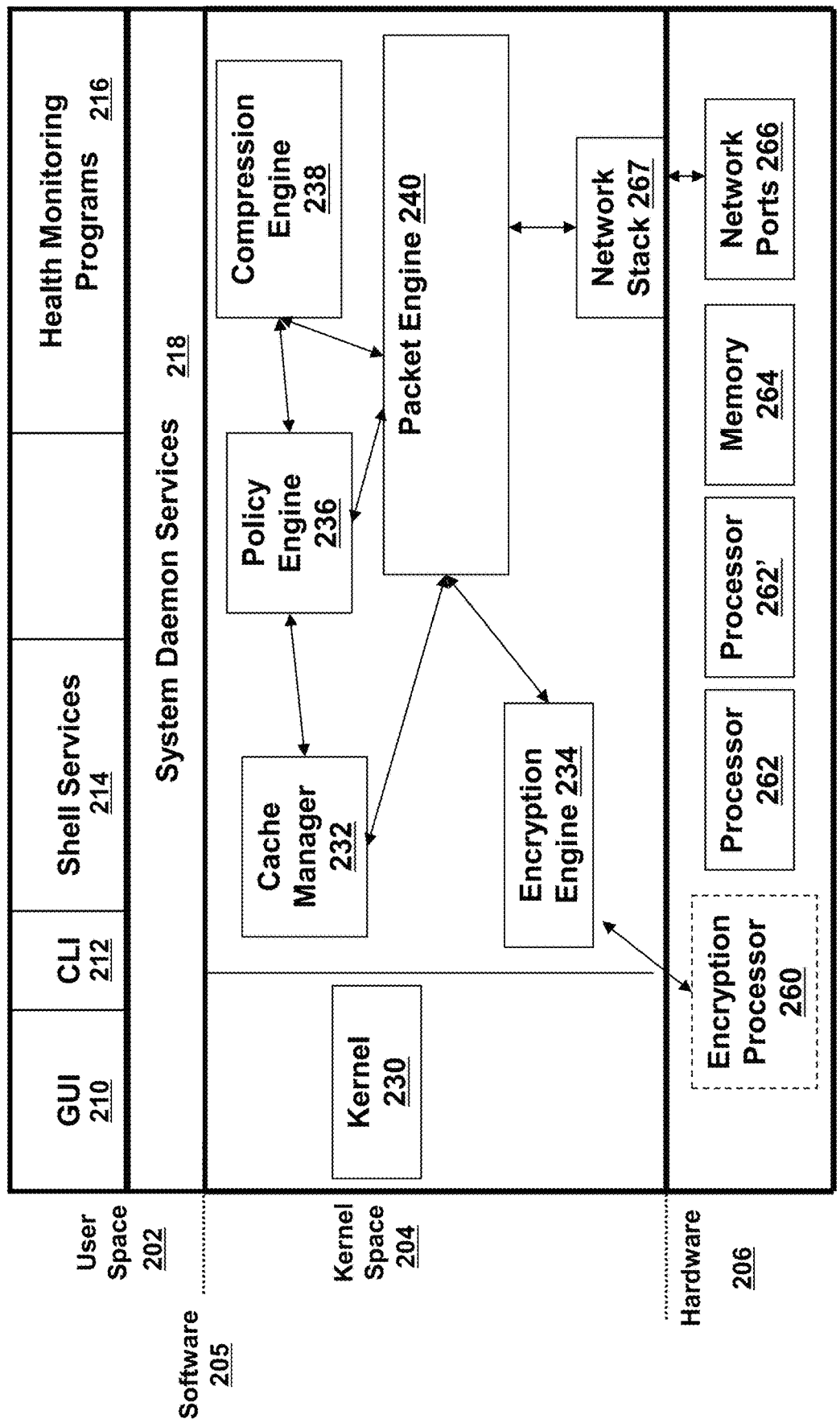
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
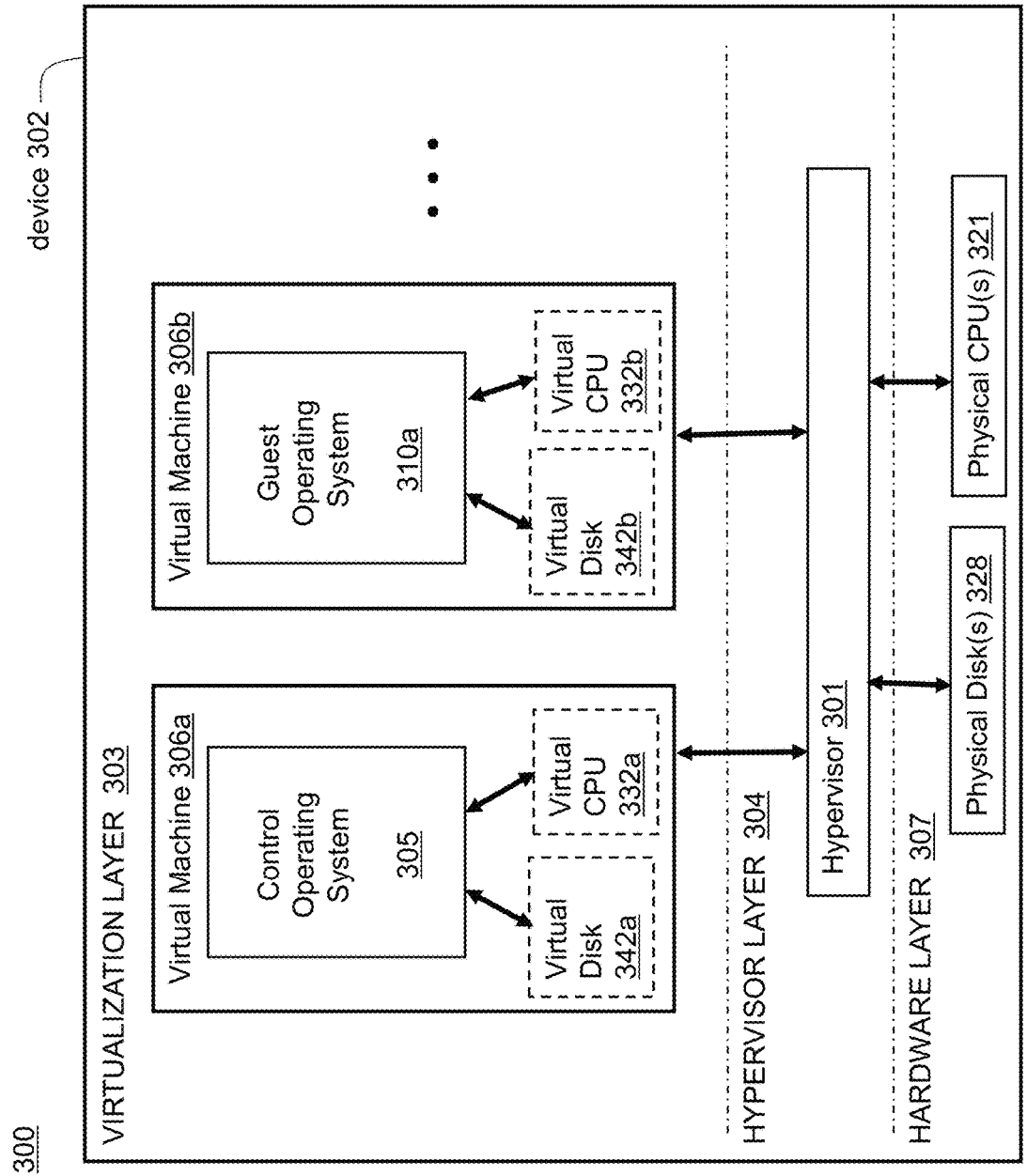
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
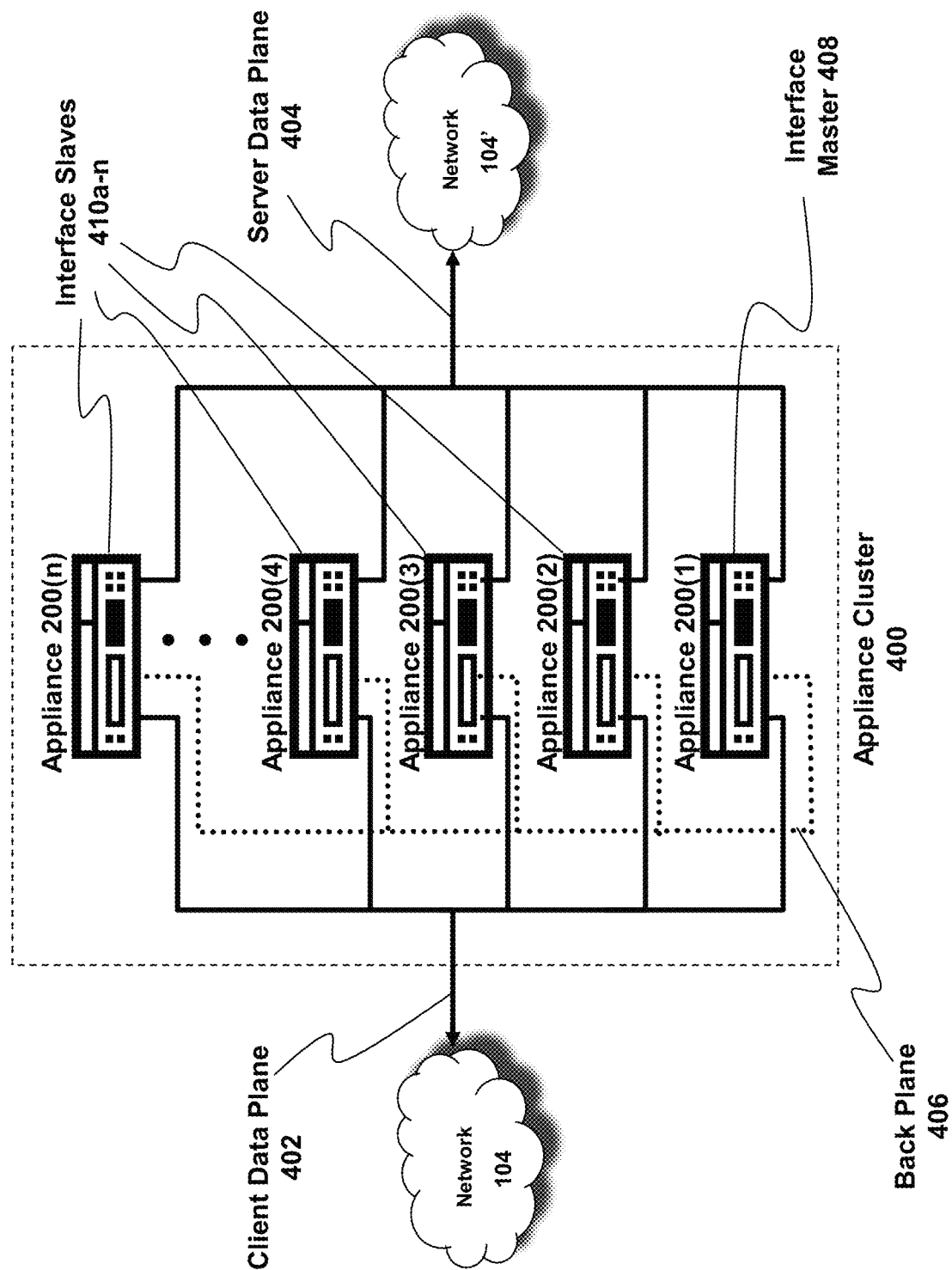
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Providing Access to Cloud-Based Applications or Services The present disclosure is directed toward systems and methods of black traffic based delivery of cloud applications and/or services. Specifically, systems and methods of the current disclosure allow for making or keeping data traffic of cloud applications and/or services opaque or inaccessible to the cloud service or corresponding entities. To prevent access to data traffic of cloud applications and/or services by the cloud service or by corresponding entities, secured connections or sessions between client devices and the cloud can be terminated at entities or components managed by the application or service provider rather than at entities or components managed by the cloud provider. Accordingly, the cloud service or corresponding entities can have access to encrypted data traffic exchanged between the client devices and cloud applications or services, but cannot have access to the corresponding decrypted data traffic.

Existing cloud services, such as Citrix Cloud service, pose a security challenge to cloud-based (or online) application or service providers. In particular, when a client device requests access to a cloud-based application or service, a node of the cloud service hosting the cloud-based application or service establishes a secure sockets layer (SSL) session (or a secured connection, in general) with the client device and another SSL session (or secured connection) with an entity (e.g., cloud connector or server) serving data associated with the cloud-based application or service. The node of the cloud service decrypts encrypted data traffic received over one of the SSL sessions, and encrypts the data traffic for sending on the other SSL session. The decryption of the data traffic by the node of the cloud service provides the cloud service or corresponding entities access to sensitive data (e.g., user data or application/service related data) exchanged between the client device and the cloud-based application or service. The access to the sensitive data poses a security threat to data and/or infrastructure of the cloud-based application or service.

Systems and methods described herein restrict access to data traffic of cloud-based applications or services by entities managed by the cloud service provider. Secured connections established with client devices for exchanging application or service data traffic can be configured to be terminated at entities managed by the cloud-based application or service. For instance, cloud connectors associated with a cloud-based application or service can be configured to maintain private keys of the secured connections established with the client devices. Entities managed by the cloud service provider cannot have access to the private keys, and can access only encrypted versions of data traffic exchanged over the secured connections.

The systems and methods described herein enhance the security of data and/or infrastructure of cloud-based (or online) applications or services. By preventing access by the cloud service (or entities managed by the cloud service provider) to decrypted data traffic of cloud-based (or online) applications or services, systems and methods described herein help protect against external threats to application/service infrastructure, and reduce the likelihood of unauthorized access to sensitive data.

Figure 5:
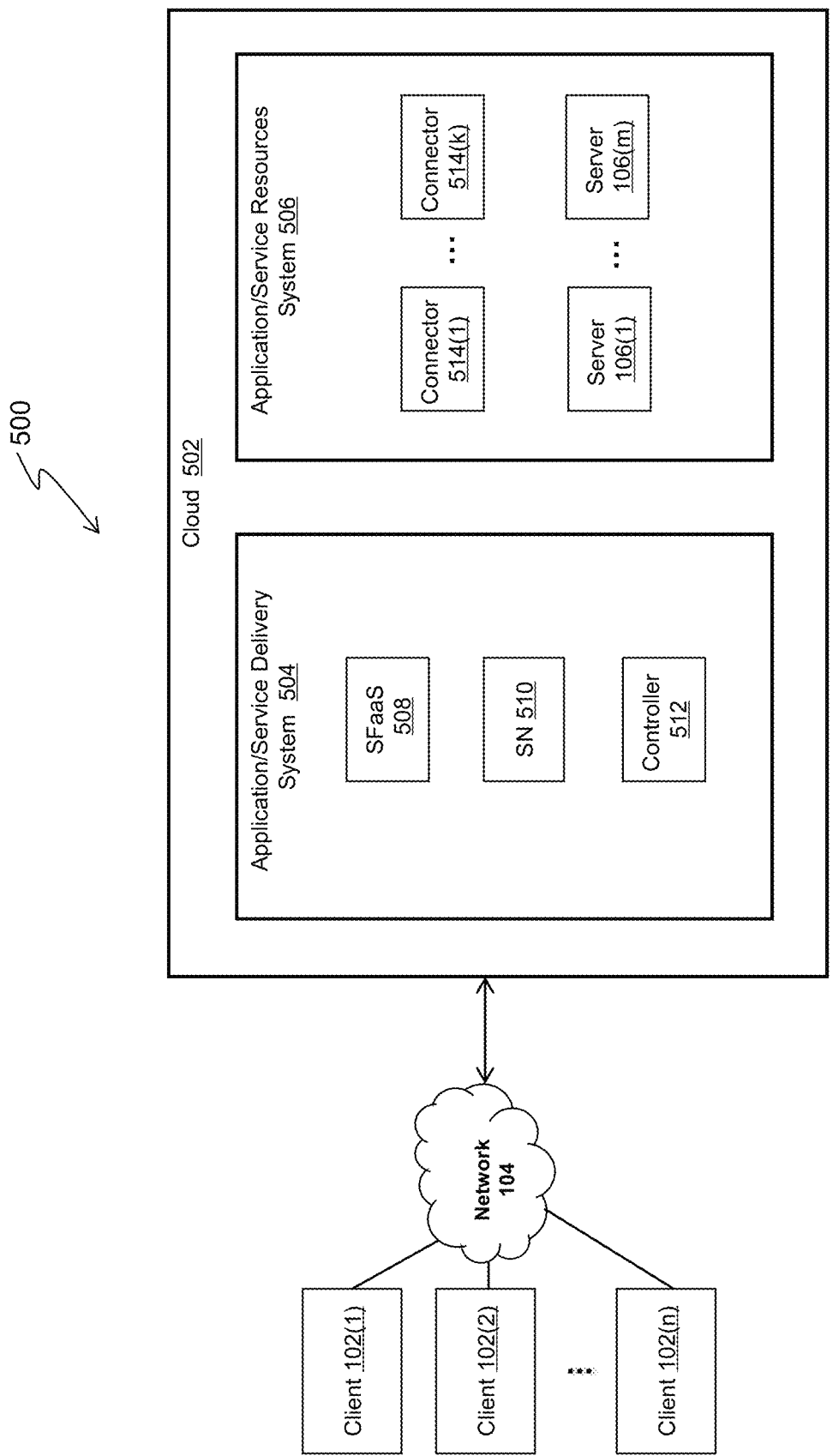
FIG. 5 is a block diagram of a computer environment for providing access to cloud-based applications or services, in accordance with an illustrative embodiment.

Referring now to FIG. 5, an embodiment of computer environment 500 for providing access to cloud-based applications or services is shown. In brief overview, the computer environment 500 may include one or more clients 102(1)-(n), a communications network 104 and a cloud 502 including an application/service delivery system 504 and an application/service resources system 506. The application/service delivery system 504 may include one or more StoreFront as a service (SFaaS) component 508, a service node 510, and a controller 512 (also referred to as a delivery controller 512). The application/service resources system 506 may include one or more connectors 514(1)-(k) (also referred to herein individually or collectively as cloud connector 514), and one or more servers 106(1)-(m) (referred to herein, individually or collectively as resource server 106). The one or more clients 102(1)-(n) may be communicatively connected to the cloud 502 or components therein via the communication network 104. Also, components of the application/service delivery system 504 and/or components of the application/service resources system 506 may be communicatively connected to each other. As used herein, the parameters k, m and n represent integer numbers.

A client 102 (e.g., among the clients 102(1)-(n)) may be a client device, such as a desktop, laptop, smartphone, or tablet. The client 102 may be communicatively connected to the cloud 502 via the communications network 104. The communications network 104, as discussed with regard to FIG. 1A above, may include a private network, such as a local area network (LAN) or a company Intranet, a public network, such as a wide area network (WAN) or the Internet, a wired network, a wireless network, or a combination thereof. The client 102 may initiate a connection with the cloud 502, for example, by sending a request to access an application or a service hosted by the cloud 502. The initiated connection may be a clientless virtual private network (VPN) connection. For instance, the client 102 may initiate the connection with the cloud 502 via a browser application or other application executable on the client 102.

The cloud 502 may include a plurality of computer servers or server racks arranged, for example, into one or more data centers. The cloud 502 may include one or more appliances 200 and/or one or more appliance clusters 400. The cloud 502 may provide access to various online applications or services including infrastructure as a service (IaaS), such as virtual machines (VMs), servers, storage, load balancers, the like, or a combination thereof, platform as a service (PaaS), such as databases, web servers, development tools, execution runtime, the like, or a combination thereof, software as a service (SaaS), such as email, virtual desktops, enterprise applications or tools, online games, the like, or a combination thereof. The online applications or services may be accessed by remote users, for example, via communications network 104 and the cloud 502. The providers of the online applications or services hosted by the cloud 502 may be different from the provider of the cloud 502 or the cloud service.

The cloud 502 may include one or more application/service resources systems 506. Each application/service resource system 506 may be associated with a respective application or service provider. The cloud 502 may include a separate application/service delivery system 504 for each application/service resources system 506, or one or more application/service delivery systems 504 each of which may be configured to serve a plurality of application/service resource systems 506.

The application/service resources system 506 may be configured to host resources, e.g., data, software, information technology (IT) infrastructure, or a combination thereof, associated with applications or services hosted by the cloud 502 for a single provider. For instance, the application/service resources system 506 may include hardware and software resources embedding or implementing applications or services associated with the corresponding provider. The application/service resources system 506 and the corresponding hardware and software resources may be managed by the provider of the applications or services hosted by the application/service resources system 506. The application/service resources system 506 may be associated with a domain name of the provider of the applications or services hosted by the application/service resources system 506. Each application/service delivery system 504 may provide access to applications or services hosted by a corresponding application/service resources system 506. In some implementations, an application/service delivery system 504 may provide access to applications or services hosted by (or associated with) multiple application/service resources systems 506.

The application/service delivery system 504 may include one or more SFaaS components 508. The SFaaS component 508 may authenticate users or clients 102 requesting access to applications or services hosted by the cloud 502. For instance, upon a client 102 requesting access to a domain name or a corresponding application or service, the SFaaS component 508 may receive user or client credentials and access an active directory (not shown in FIG. 5) to check whether the received credentials match stored credentials in the active directory and/or whether the user or client 102 requesting the access is authorized to have such access. The SFaaS component 508 may host one or more portals (e.g., an enterprise application store) for one or more application/service providers or one or more application/service resources systems 506. Each portal may provide or include a user interface (UI) listing applications and/or services (e.g., desktops) associated with a corresponding provider of cloud-based applications and/or services, and allowing self-service access to such applications and/or services. The SFaaS component 508 may also keep track of application subscriptions, shortcut names, and/or other data associated with each user 102, for example, to ensure consistent user experience across multiple devices. The SFaaS component 508 may be viewed and referred to as an application manger 508 configured to keep track of applications or services provided by one or more providers, and provide visual interactive tools to allow initiating access to each of the provided applications or services.

The application/service delivery system 504 may include one or more service nodes (SNs) 510. The service node 510 may act as a proxy between clients 102 and the application/service resources system(s) 506. As described in further detail below with regard to FIG. 6, the service node 510 may facilitate establishing secure connections between clients 102 and the application/service resources system(s) 506. Acting as an intermediate entity (or proxy) the service node 510 may forward received requests, responses, and/or encrypted data traffic to a client 102 or an application/service resources system 506 involved in a secured session or connection for accessing applications or services hosted by that application/service resources system 506. The service node 510 may maintain and provide information (e.g., application name, uniform resource locator (URL), and/or other application/service information) of applications or services provided by a corresponding provider. The service node 510 may maintain one or more data structures indicative of the connector(s) 514 associated with each application or service of the provider. In some implementations, each service node 510 may be associated with (or configured to serve content associated with) a corresponding provider of cloud-based applications or services. Access to cloud-based applications or services of a given provider may be managed by one or more service nodes. In some implementations, a service node 510 may be associated with (or configured to serve content associated with) a plurality of providers of cloud-based applications or services.

The application/service delivery system 504 may include one or more delivery controllers 512. The delivery controller 512 may control access to the cloud connectors 514 by the service node 510. Specifically, the delivery controller 512 may instruct a specific cloud connector 514 to communicate with the service node 510, for example, responsive to a request from the service node 510. The delivery controller 512 may be (e.g., configured to perform functions of) a software-defined perimeter (SDP) controller, and may communicate with the cloud connectors 514 and/or the service node 510 over corresponding control channels. In communicating with the delivery controller 512 or the cloud connectors 514, the service node 510 may act as (or perform functions) of a SDP initiating host.

The application/service resources system 506 may include a plurality of resource servers 106(1)-(m). The resource servers 106(1)-(m) may form a server farm 38 as discussed above with regard to FIG. 1C. The servers 106(1)-(m) may store or maintain data, information resources (e.g., webpages, application interfaces, or a combination thereof), and/or software associated with applications or services offered by a corresponding provider. The servers 106(1)-(m) may also execute computer code instructions associated with applications or services offered by a corresponding provider. For instance, the servers 106(1)-(m) may handle requests from clients 102, provide requested data or information resources, perform processing steps (e.g., processing steps associated with an online game, an enterprise application, or other application or service).

The application/service resources system 506 may include a plurality of resource servers 106(1)-(m), a plurality of cloud connectors 514(1)-(k). The cloud connectors 514 provide access to the resource servers 106 and resources therein. In some implementations, each cloud connector 514 may be associated with (e.g., configured to provide access to) one or more corresponding servers 106, one or more corresponding applications or services hosted by the application/service resources system 506, one more corresponding information resources, or a combination thereof. For instance, each cloud connector 514 may be associated with (e.g., configured to provide access to) one or more uniform resource locators (URLs) indicative of server(s) 514, application(s) or service(s), or information resource(s). The service node 510 and/or the delivery controller 512 may maintain data structures (e.g., a table or hash table) mapping each application, service, or resource associated with the application/service resources system 506 (or a cloud-based applications or services provider) to one or more corresponding cloud connectors 514 providing access to that application, service, or resource.

Each cloud connector 514 may be configured to act as, or perform operations or functions associated with, a SDP accepting host. The cloud connectors 514 may be implemented as software modules residing on the resource servers 106 or other servers of the application/service resources system 506. Each cloud connector 514 may be implemented in hardware, or a combination of hardware and software, in one or more embodiments. For instance, each cloud connector 514 may include any application, program, library, script, task, service, process or any type and form of executable instructions executing on hardware of the server 106 or appliance 200. The hardware may include circuitry such as one or more processors, for example, as described above in connection with the computing device 101 of FIG. 1C, in one or more embodiments.

The application/service resources system 506 may be managed by the provider of the corresponding cloud-based applications or services. The provider or operator of the cloud 502 may not have access to data, information resources, software, or IT resources associated with the application/service resources system 506. Also, components or entities of the application/service delivery system 504 may facilitate communications between the clients 102 and the application/service resources system 506 (or entities thereof) but may not have access to non-encrypted data traffic exchanged between the clients 102 and the application/service resources system 506.

The application/service delivery system 504 may include one or more appliances 200 or an appliance cluster 400 (e.g., as discussed above with regard to FIGS. 1A-4) acting as intermediary device(s) between clients 102 and resource servers 106. For instance, a separate appliance 200 or appliance cluster 400 may be dedicated to each provider of cloud-based applications or services (or a corresponding domain name). All elements or entities or a subset thereof, of the application/service delivery system 504 may be implemented on appliance 200 or appliance cluster 400. For instance, at least the service node 510, or the service node 510 and the SFaaS component 508, may be implemented on a single appliance 200 or an appliance cluster 400. The application/service delivery system 504 may include other hardware components such as servers, chips, or other devices. In general, each of the elements or entities of the application/service delivery system 504 (e.g., SFaaS component 508, service node, and delivery controller 512) may be implemented in hardware, or a combination of hardware and software, in one or more embodiments. For instance, each of these elements or entities may include any application, program, library, script, task, service, process or any type and form of executable instructions executing on hardware of a device, such as the computing device 101 of FIG. 1C, in one or more embodiments.

Figure 6:
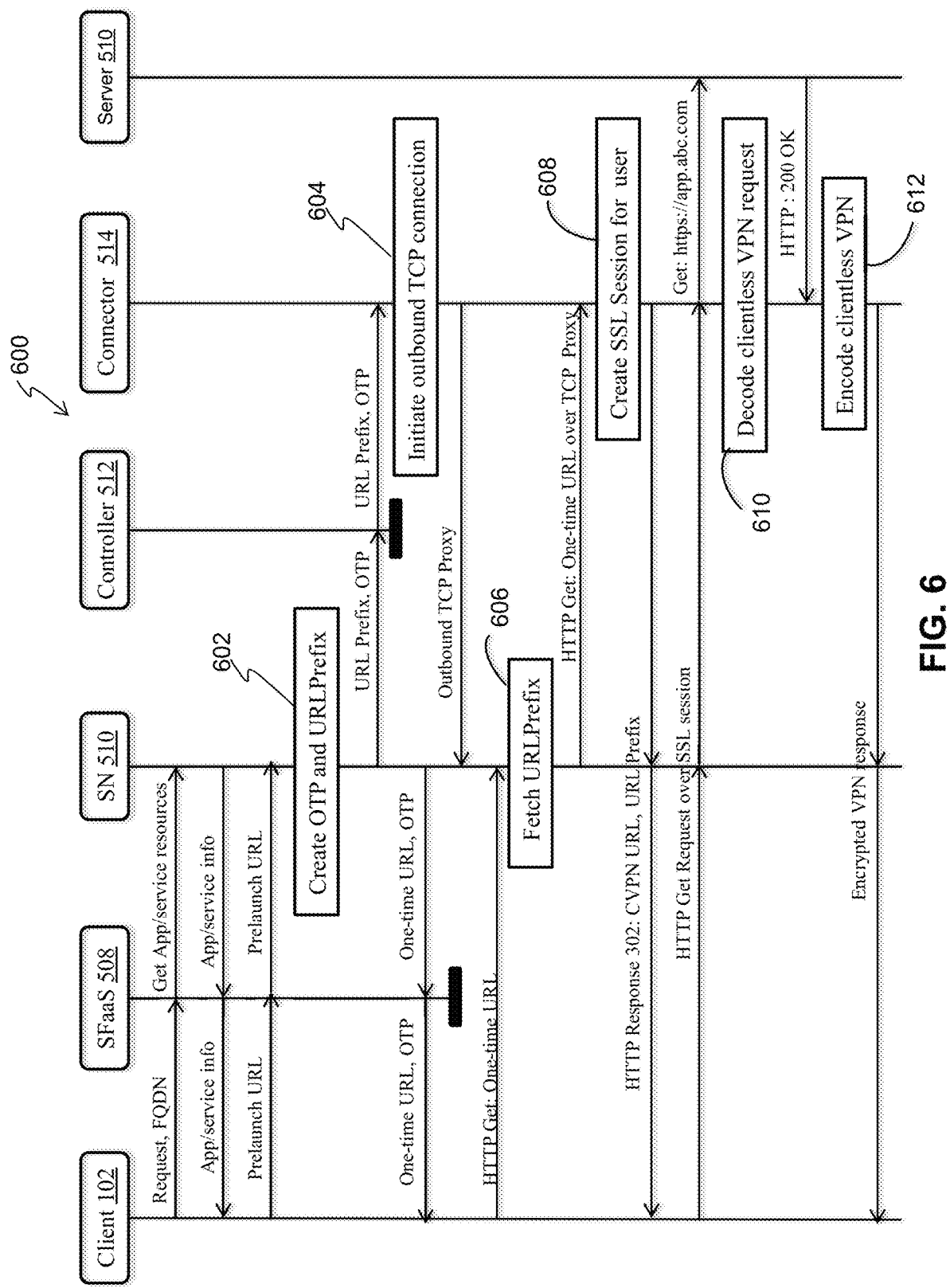
FIG. 6 is a signaling diagram illustrating communications between various entities for providing access to a cloud-based application or service, in accordance with an illustrative embodiment.

Referring to FIG. 6, a signaling diagram 600 illustrates example communications between various entities for providing access to a cloud-based application or service, in accordance with an illustrative embodiment. An end user of a client 102 may access, via the client, a fully qualified domain name (FQDN) of an application/service provider (e.g., https://sf.abc.com, with "sf" referring to the SFaaS component 508 and the provider's top level domain being "abc.com"). The end user may, for example, access the provider's FQDN via a browser (or other application) executing o the client 102. In response, the client 102 may send a request for accessing the provider's domain and for published resources associated with the requested domain. Responsive to receiving the request, the SFaaS component 508 may authentication the end user. Upon successful authentication, the SFaaS component 508 may request information about applications or services published by (or offered by) the requested domain.

The service node 510 may provide the requested information to the SFaaS component 508. The information provided by the service node 510 may include application or service names, a prelaunch URL for launching an application or service provided by the domain, one or more content URLs (or addresses) for accessing specific content, application, service, or information resource provided by the requested domain, or a combination thereof. The SFaaS component 508 may use the information received from the service node 510 to update a portal (also referred to as application/service store) listing the published applications or services associated with the requested domain. The portal may include a user interface (UI), for example, including interactive icons, links, or other UI elements for initiating access to applications (e.g., web applications) or services (e.g., a software as a service (SaaS) based applications) published by the requested domain (e.g., "abc.com"). The portal may include a webpage or other information resource maintained or managed by the SFaaS component 508. The SFaaS component 508 may send the portal to the client 102 and/or information indicative of published applications or services associated with the requested domain.

Upon receiving the portal, the client 102 (or the corresponding user) may initiate a request to access a specific application or service, for example, by actuating an icon or link of the portal. In response, the client 102 may send the request to the SFaaS component 508, which may forward the request to the service node 510. The request may include the prelaunch URL and a content URL. The content URL may be embedded within the prelaunch URL. In response, the service node 510 may identify, at block 602, a cloud connector 514 serving the requested application, service, or content indicated or referenced by the content URL. The service node 510 may lookup the cloud connector 514 from a data structure maintained by or accessible to the service node 510. The service node may generate a URL prefix (urlp) indicative of the identified cloud connector 514. For instance, the URL prefix may include a key retrieved from a hash table maintained by or accessible to the service node 510. The value of the key may identify the cloud connector 514 providing access to the received content URL. The URL prefix may also include other information (or details) specific to the client 102, the user of the client 102, the requested application, service, or content associated with the received content URL, or a combination thereof.

The service node 510 may also generate or create a one-time password (OTP) to validate a client connection for accessing the application, service, or content associated with the received content URL. The service node 510 may generate the OTP, for example, using a random number or random string generator or selector. The use of a separate OTPs to validate separate client connections or sessions to access published applications or services enhances security of the cloud 502 and/or the domains (e.g., application/service provider domains) hosted by the cloud 502 since each OTP is for use when establishing a single connection or session. As such, each OTP has a relatively short life span, which reduces the risk of potential misuse of the OTP by unauthorized intruders or hackers.

The server node 510 may append the URL prefix to the content URL received from the SFaaS component 508. The server node 510 may also attach the generated OTP to the content URL, for example, as a query parameter. Since the generated OTP is for one time use, the modified URL, which includes the generated OTP is a one-time URL. The service node 510 may send the modified content URL (or one-tome URL) to the client 102 (or a corresponding browser) via the SFaaS component 508. For example, if the content URL is https://ngs.abc.com/?something, the corresponding modified (or one-time) URL may be https://urlp.ngs.abc.com/?something&OTP=<otp> where "urlp" is the generated URL prefix, "ngs" refers to "Netscaler Gateway Service," and "OTP=<otp>" represents a query parameter indicative of the generated OTP. The service node 510 may also send the generated URL prefix, the generated OTP, the information specific to the client 102, the user, and/or the requested application or service, or a combination thereof to the identified cloud connector 514 via the delivery controller 512. The delivery controller 512 may forward the received information (e.g., OTP, URL prefix and user/client/application specific information) to the cloud connector 514 referenced by the URL prefix, and instruct that cloud connector 514 to communicate with the service node 510 and/or establish a secured connection or session (e.g., SSL session) with the client 102. The service node 510 and/or the cloud connector 514 may maintain a mapping between, for example, via a data structure, between the generated OTP, the generated URL prefix, and information identifying the client user and/or the client 102.

Responsive to receiving the OTP, URL prefix, user/client/application specific information, and instruction from the delivery controller 512, the cloud connector 514 may initiate and establish, at block 604, an outbound transport protocol (TCP) connection (also referred to as TCP proxy channel) with the service node 510. The service node 510 and the cloud connector 514 may communicate over the established TCP proxy channel to provide the client 102 access to requested content, application, or service.

Upon receiving the one-time URL, the client 102 may attempt to access or load the received one-time URL. The client 102 may send a client hello message to the service node 510 for forwarding to the cloud connector identified by the URL prefix. The client hello message may include a field, such a server name indicator (SNI) field, incorporating or including the URL prefix. This SNI field may be indicative of the hostname of resource server 106 hosting the requested content, application, or service which the client 102 (or the corresponding browser) is trying to fetch. The client hello message may be an HTTP GET message including a client hello data packet. In some embodiments, the HTTP GET message is separately sent and received from the client hello message. The HTTP GET message and/or the client hello message may include the one-time URL previously received by the client 102 from the service node 510.

Upon receiving the client hello message and/or HTTP GET message, the service node may retrieve URL prefix from the SNI field. The service node 510 may lookup or fetch, at block 606, the retrieved URL prefix in the hash table maintained by, or accessible to, the service node 510 to identify, for example, a name of the cloud connector 514 identified by the URL prefix. The service node 510 may resolve the Internet Protocol (IP) address of the cloud connector 514 based on the corresponding identified name. Using the resolved IP address, the service node 510 may forward the client hello message to the cloud connector 514 referenced or identified by the URL prefix over the established TCP proxy channel.

Upon receiving the client hello message and/or HTTP GET message, the cloud connector 514 may validate the client 102 or the corresponding user by checking the OTP in the one-time URL against OTPs stored or maintained by the cloud connector 514. If a match is found, the cloud connector 514 may create, at block 608, a secure connection or session (e.g., SSL session) for the client 102 or the corresponding user. In certain embodiments, the cloud connector 514 may respond to the received client hello message by sending back a HTTP Response (e.g., with the clientless VPN URL and/or the URL prefix). In some embodiments, the cloud connector 514 may respond to the received client hello message by sending back a wildcard certificate that matches or includes the hostname of the server or the domain hosting the requested content, application, or service to the client 102 via the service node (over the TCP proxy channel). The client 102 or the corresponding browser may accept the received wildcard certificate since it matches or includes the server hostname. The cloud connector 514 may also engage in a SSL handshake with the client 102. SSL handshake packets exchanged between the client 102 and the cloud connector 514 may be transmitted via the service node 510, and the service node may exchange the SSL packets with the cloud connector over the established TCP proxy channel. For instance, a HTTP Get Request from the browser/client can be sent via the service node to the cloud connector 514.

The private keys of the established secure session (e.g., SSL session) may be maintained by (or accessible to) the cloud connector 514, the cloud connector 514 may terminate the established secure (e.g., SSL) connection. In other words, encrypted data traffic exchanged over the SSL connection may be decrypted at the cloud connector 514 or the client. Accordingly, the cloud connector may communicate with the client 102 (or the corresponding browser) over the established SSL channel which cannot be decrypted by service node 510 or any other entity managed by the cloud operator. The cloud 502, and the service node 510 in particular, may act as a TCP proxy and may only see or access encrypted HTTPS payload on the TCP connection established with the cloud connector 514.

The cloud connector 514 may send a clientless VPN URL corresponding to the requested content, application, or service to the client 102 via the established TCP proxy channel with the service node 510. The HTTP Response may include cookie information (e.g., Set-Cookie: NSC_AAAC=xxxxxxxxx; httpOnly; Secure;). For instance, the cloud connector 514 may issue an authentication cookie (e.g., NSC_AAAC), and redirect the HTTP Response with clientless VPN application URL sufficed with the URL prefix received in the one-time URL. The service node 510 may forward the clientless VPN URL to the client 102. The clientless VPN URL may include the URL prefix indicative of the cloud connector 514. After this, CVPN requests can carry URL prefix in the hostname, which can cause SSL handshake to carry the URL prefix in the SNI field. Based on this URL prefix, connection can be proxied to appropriate cloud connector, and the service node can transfer the encrypted data (e.g., in bit pump mode) between the client and the cloud connector. All these authenticated connections can carry the cookie (e.g., NSC_AAAC cookie). The cloud connector can use the cookie to retrieve a session and can perform clientless VPN processing. For example, the client 102 (or the corresponding browser) may request access to the content, application, or service by sending the clientless VPN URL to the cloud connector 514 via the service node 510. The service node 510 may retrieve the URL prefix from the clientless VPN URL, lookup the name of the cloud connector in the hash table using the retrieved URL prefix, and determine the IP address of the cloud connector 514 using the DNS. Using the determined IP address, the service node may send the clientless VPN URL to the cloud connector 514.

The cloud connector 514 may decode, at block 610, the received clientless VPN URL, for example, using private key(s) of the established SSL channel to identify a specific requested content, application, or service, or a corresponding resource server 106 hosting the requested content, application, or service. The cloud connector 514 may send a request to the identified resource server 106 for the content, application, or service, for example, over another secure connection between the cloud connector 514 and the resource server 106. The resource server 106 may send a response (e.g., including a requested webpage) back to the cloud connector 514. The cloud connector 514 may encode, at block 612, the received response, for example, using the private key(s) of the SSL channel established for/with the client 102, and forward the encrypted response to the client via the TCP proxy channel established between the cloud connector 514 and the service node 510. The service node 510 may forward the encrypted response to the client 102, and the client browser my decrypt and display the response to the client's user.

Figure 7:
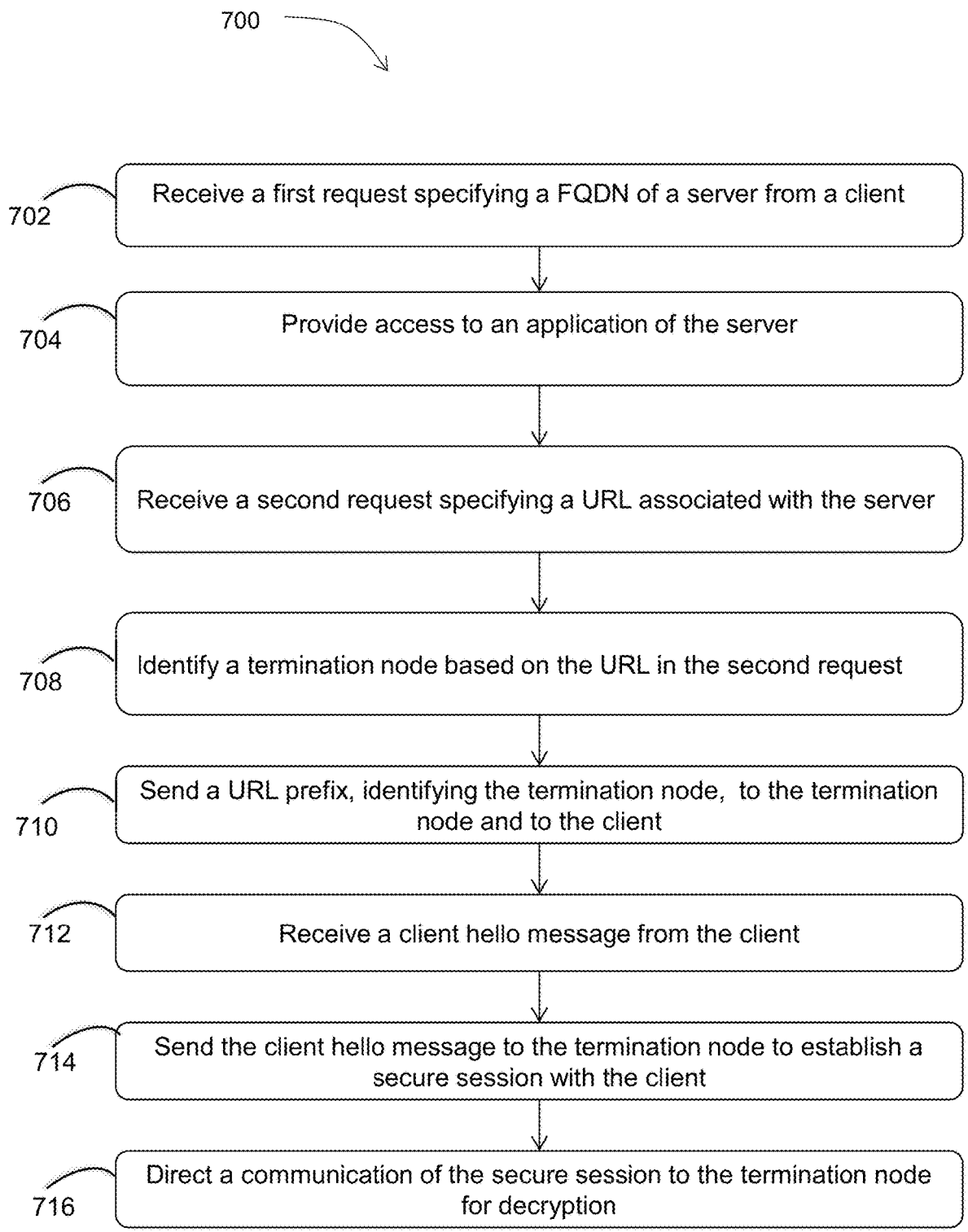
FIG. 7 is a flow diagram of a method for providing access to a cloud-based application or service, in accordance with an illustrative embodiment.

Referring to FIG. 7, a flow diagram of a method 700 of providing access to a cloud-based application or service is depicted, in accordance with an illustrative embodiment. The steps of the method 700 may be implemented using elements or entities associated with the application/service delivery system 504 described above with regard to FIG. 5. In brief overview, service node 510 may receive a first request specifying a FQDN associated with a resource server 106 (or corresponding domain) from a client 102 (BLOCK 702). An application manager (the SFaaS component 508) may provide access to an application of the resource server (BLOCK 704). The service node 510 may receive a second request including a URL (BLOCK 706), and identify a termination node (cloud connector 514) based on the URL in the second request (BLOCK 708). The service node 510 may send the URL prefix identifying the termination node to the client 102 and the termination node (BLOCK 710). The service node 510 may receive a client hello message from the client 102 (BLOCK 712), and forward the client hello message to the termination node for establishing a secure session with the client 102 (BLOCK 714). Upon the secure session being established, the service node may forward communication of the secure session to the termination node for decryption (BLOCK 716).

The method 700 may be performed as discussed with regard to the signaling diagram 600 of FIG. 6. In particular, the termination node refers to the cloud connector 514 at which the secure (or SSL) channel is terminated. The application manager refers to the SFaaS component 508 which may authenticate the client 102, and provide an application/service portal to the client 102 to allow the client to access applications or services associated with a domain associated with the FQDN in the first request. The service node 510, as discussed with regard to FIG. 6 may act as TCP proxy between the client and the termination node (or the cloud connector 514), and may only see encrypted data traffic exchanged between the termination node and the client 102.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

What is claimed is:

1. A method comprising:
receiving, by a device that is intermediary between a client and a server, from the client, a fully qualified domain name of an application hosted on a cloud-based network to access the application, and a uniform resource locator (URL) to content of the server accessed via the cloud-based network;
generating, by the device, a URL prefix indicative of a cloud connecter identified by the device and a one-time password for authenticating the client by the cloud connector, the cloud connector separate from and providing access to the server;
generating, by the device, a modified URL including the URL, the URL prefix and the one-time password, by appending the URL prefix to the URL and including the one-time password as a parameter of the URL;
forwarding, by the device, the URL prefix and the one-time password to the cloud connector and the modified URL to the client;
establishing, by the device, a transport layer connection terminating at the cloud connector;

receiving, by the device, a request from the client using the modified URL to establish a secure session with the server;

forwarding, by the device via the transport layer connection, the request to the cloud connector identified from the URL prefix of the modified URL to cause the cloud connector to establish the secure session over the transport layer connection with the client using the one-time password to access the server; and proxying, by the device, encrypted communications of the secure session between the client and the server via the cloud connector over the transport layer connection.

2. The method of claim 1, wherein access to decrypted data of the encrypted communications by the device is prevented.

3. The method of claim 1, wherein the client and the cloud connector have one or more private keys to decrypt the encrypted communications of the secure session and wherein the device does not have access to the one or more private keys to decrypt the encrypted communications.

4. The method of claim 1, further comprising generating the URL prefix to have a key identifying the cloud connector.

5. The method of claim 1, further comprising generating the URL prefix to include information on one or more of the client, a user of the client, the application or content associated with the URL.

6. The method of claim 1, further comprising, receiving by the device, the request as a client hello message identifying the URL prefix.

7. The method of claim 6, wherein the client hello message is a HyperText Transfer Protocol (HTTP) GET message.

8. The method of claim 6, wherein the URL prefix is identified in a server name indicator (SNI) field of the client hello message.

9. A system comprising:

a device that is intermediary between a client and a server, the device comprising one or more processors, coupled to a memory and configured to:

receive from the client a fully qualified domain name of an application hosted on a cloud-based network to access the application, and a uniform resource locator (URL) to content of the server accessed via the cloud-based network;

generate a URL prefix indicative of a cloud connecter identified by the device and a one-time password authenticating the client by the cloud connector, the cloud connector separate from and providing access to the server;

generate a modified URL including the URL, the URL prefix and the one-time password, by appending the URL prefix to the URL and including the one-time password as a parameter of the URL;

forward the URL prefix and the one-time password to the cloud connector and the modified URL to the client;

establish a transport layer connection terminating at the cloud connector;

receive a request from the client using the modified URL to establish a secure session with the server;

forward, via the transport layer connection, the request to the cloud connector identified from the URL prefix of the modified URL to cause the cloud connector to establish the secure session over the transport layer connection with the client using the one-time password to access the server; and proxy encrypted communications of the secure session between the client and the server via the cloud connector over the transport layer connection.

10. The system of claim 9, wherein access to decrypted data of the encrypted communications by the device is prevented.

11. The system of claim 9, wherein the client and the cloud connector have one or more private keys to decrypt the encrypted communications over the secure session and wherein the device does not have access to the one or more private keys to decrypt the encrypted communications.

12. The system of claim 9, further comprising generating the URL prefix to have a key identifying the cloud connector.

13. The system of claim 9, further comprising generating the URL prefix to include information on one or more of the client, a user of the client, the application or content associated with the URL.

14. The system of claim 9, further comprising, receiving by the device, the request comprising a client hello message identifying the URL prefix in a server name indicator (SNI) field of the client hello message.

15. A non-transitory computer-readable medium comprising instructions that, when executed by one or more processors of a device, cause the device to:

receive from a client a fully qualified domain name of an application hosted on a cloud-based network to access the application, and a uniform resource locator (URL) to content of the server accessed via the cloud-based network;

generate a URL prefix indicative of a cloud connecter identified by the device and a one-time password authenticating the client by the cloud connector, the cloud connector separate from and providing access to the server;

generate a modified URL including the URL, the URL prefix and the one-time password, by appending the URL prefix to the URL and including the one-time password as a parameter of the URL;

forward the URL prefix and the one-time password to the cloud connector and the modified URL to the client;

establish a transport layer connection terminating at the cloud connector;

receive a request from the client using the modified URL to establish a secure session with the server;

forward, via the transport layer connection the request to the cloud connector identified from the URL prefix of the modified URL to cause the cloud connector to establish the secure session over the transport layer connection with the client using the one-time password to access the server; and proxy encrypted communications of the secure session between the client and the server via the cloud connector over the transport layer connection.

16. The computer-readable medium of claim 15, wherein access to decrypted data of the encrypted communications by the device is prevented.

17. The computer-readable medium of claim 15, wherein the client and the cloud connector have one or more private keys to decrypt the encrypted communications over the secure session and the device does not have access to the one or more private keys to decrypt the encrypted communications.

* * * * *